United States Patent [19]

Daigle

[11] 4,449,199
[45] May 15, 1984

[54] ULTRASOUND SCAN CONVERSION AND MEMORY SYSTEM

[75] Inventor: Ronald E. Daigle, Sunnyvale, Calif.

[73] Assignee: Diasonics Cardio/Imaging, Ind., Salt Lake City, Utah

[21] Appl. No.: 206,243

[22] Filed: Nov. 12, 1980

[51] Int. Cl.$^3$ .............................................. G06F 15/20
[52] U.S. Cl. ..................................................... 364/900
[58] Field of Search ............... 364/200, 900; 340/747, 340/722, 798, 799; 367/87

[56] References Cited

U.S. PATENT DOCUMENTS

| | | | |
|---|---|---|---|
| 3,956,737 | 5/1976 | Ball | 364/200 |
| 3,995,253 | 11/1976 | Morrin et al. | 364/900 |
| 3,995,559 | 12/1976 | Morrin et al. | 364/900 |
| 4,051,551 | 9/1977 | Lawrie et al. | 364/200 |
| 4,090,174 | 5/1978 | Van Voorhis | 364/900 |
| 4,092,728 | 5/1978 | Baltzer | 364/900 |
| 4,150,364 | 4/1979 | Baltzer | 364/900 |
| 4,162,534 | 7/1979 | Barnes | 364/900 |

FOREIGN PATENT DOCUMENTS

| | | |
|---|---|---|
| 1423397 | 2/1976 | United Kingdom . |
| 1504713 | 3/1978 | United Kingdom . |
| 1505914 | 4/1978 | United Kingdom . |
| 1533368 | 11/1978 | United Kingdom . |
| 1547942 | 7/1979 | United Kingdom . |

*Primary Examiner*—Charles E. Atkinson
*Assistant Examiner*—Michael R. Fleming
*Attorney, Agent, or Firm*—Blakely, Sokoloff, Taylor & Zafman

[57] ABSTRACT

Imaging information characterizable as a pixel grid or matrix of 256 image columns and 512 image rows is supplied by a scanning transducer means delivering a series of ray lines of information where each ray corresponds to an image column. The incoming pixels of the rays are converted into digitized data words, and stored for scan conversion by being routed, in simultaneous blocks of eight words, to a respective one of eight different page memories, in accordance with an image memory organization scheme assigning a different page routing number to each pixel of a block for the entire image matrix, to enable parallel memory access for both input and output operations. The first page for the first pixel of each incoming ray is determined by logic which subtracts the ray or column number from eight, modulo 8. Subsequent pages are generated by incrementing repetitively within the range 0, 1, 2 . . . for each subsequent incoming pixel, after being set to said first page number. Each page is associated with a corresponding element of an input buffer, to receive the corresponding pixel for each incoming column block. All elements of the full buffer are dumped in parallel to the eight page memories simultaneously. This occurs repetitively for all blocks of each ray/column until each pixel of a frame is stored at an individually separate page address determined by simple arithmetical logic. For output, the page memories are read out in rows, in simultaneous parallel row blocks of eight, one block element from each page, to an output buffer having an element connected to each page, with the page address for each pixel of a row block determined by a simple arithmetical operation. The output buffer elements are fed serially to a video display subsystem in an order determined by the page routing numbers of the rows of the image memory organization scheme. Simple circuitry determines the order of buffer element readout, with the first page/-buffer element number being simply the number of the image row being read out, (Modulo 8), and subsequent page/buffer element numbers of that row being generated incrementing repetitively within the range 0, 7, 6 . . . 1, after being set to said row first page number. Such readout in successive rows of course effects conversion to a conventional video format for display.

30 Claims, 12 Drawing Figures

PRIOR ART MEMORY ORGANIZATION

DISPLAY GEOMETRY FOR DIGITAL SCAN PROCESSOR IMAGE MEMORY

IMAGE MEMORY ORGANIZATION

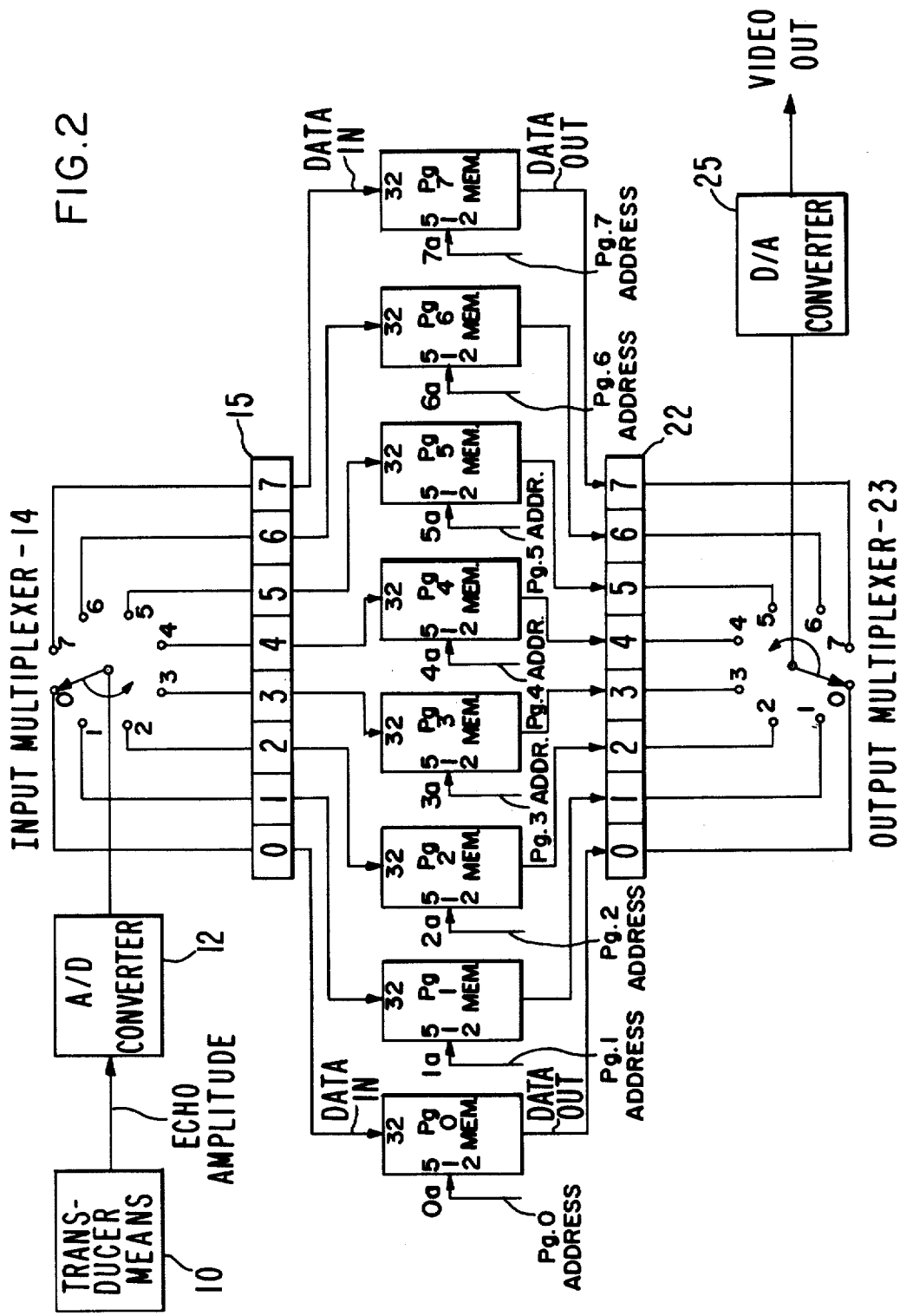

FIG. 5

1ST ALTERNATE IMAGE MEMORY ORGANIZATION

←— 256 COLUMNS —→

512 ROWS

2ND ALTERNATE IMAGE MEMORY ORGANIZATION

←— 256 COLUMNS —→

512 ROWS

3RD ALTERNATE IMAGE MEMORY ORGANIZATION

←— 256 COLUMNS —→

512 ROWS

```
0 7 6 5 4 3 2 1 0 7 - -
7 0 7 6 5 4 3 2 1 - - -
6 7 0 7 6 5 4 3 2 - - -
5 6 7 0 7 6 5 4 3 - - -
4 5 6 7 0 7 6 5 4 - - -
3 4 5 6 7 0 7 6 5 - - -
2 3 4 5 6 7 0 7 6 - - -
1 2 3 4 5 6 7 0 7 - - -
0 1 2 3 4 5 6 7 0 - - -
- - - - - - - - - - - -
- - - - - - - - - - - -
```

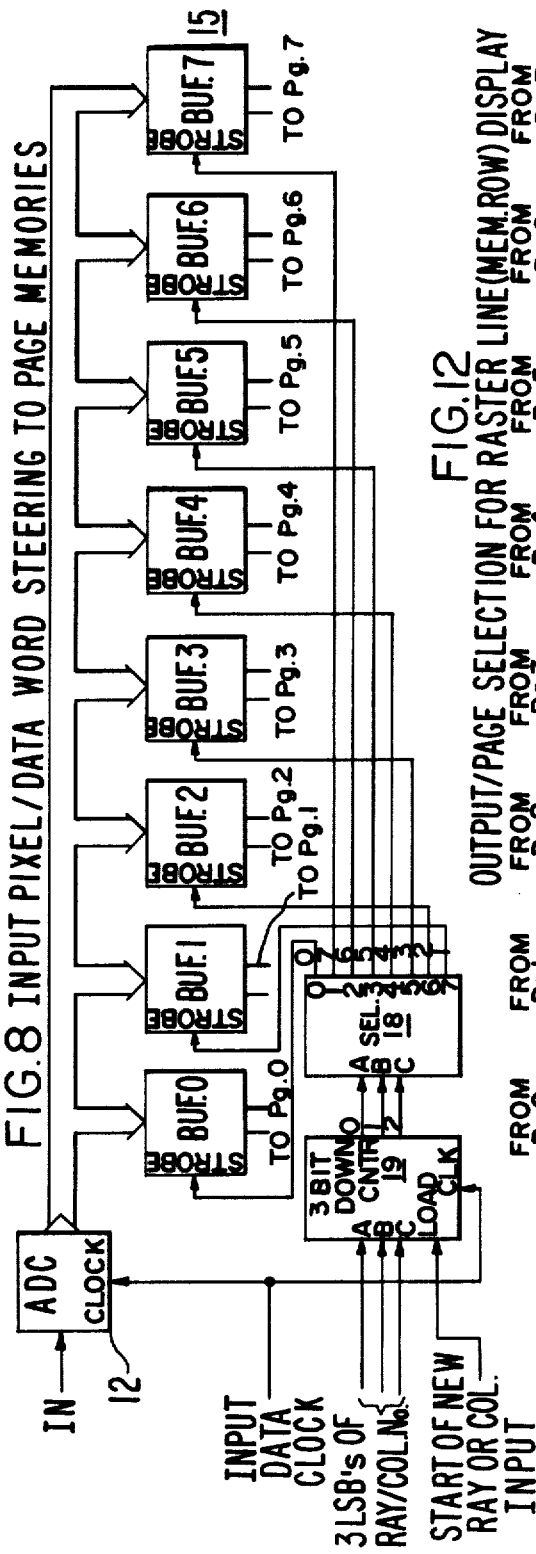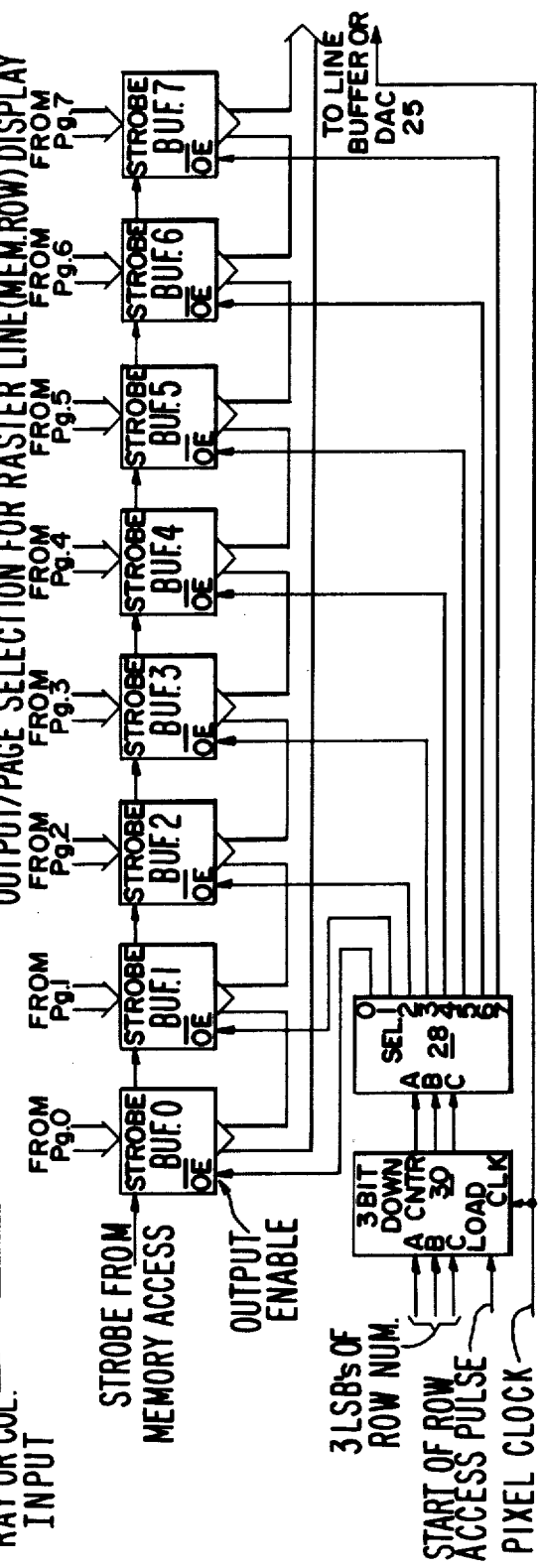

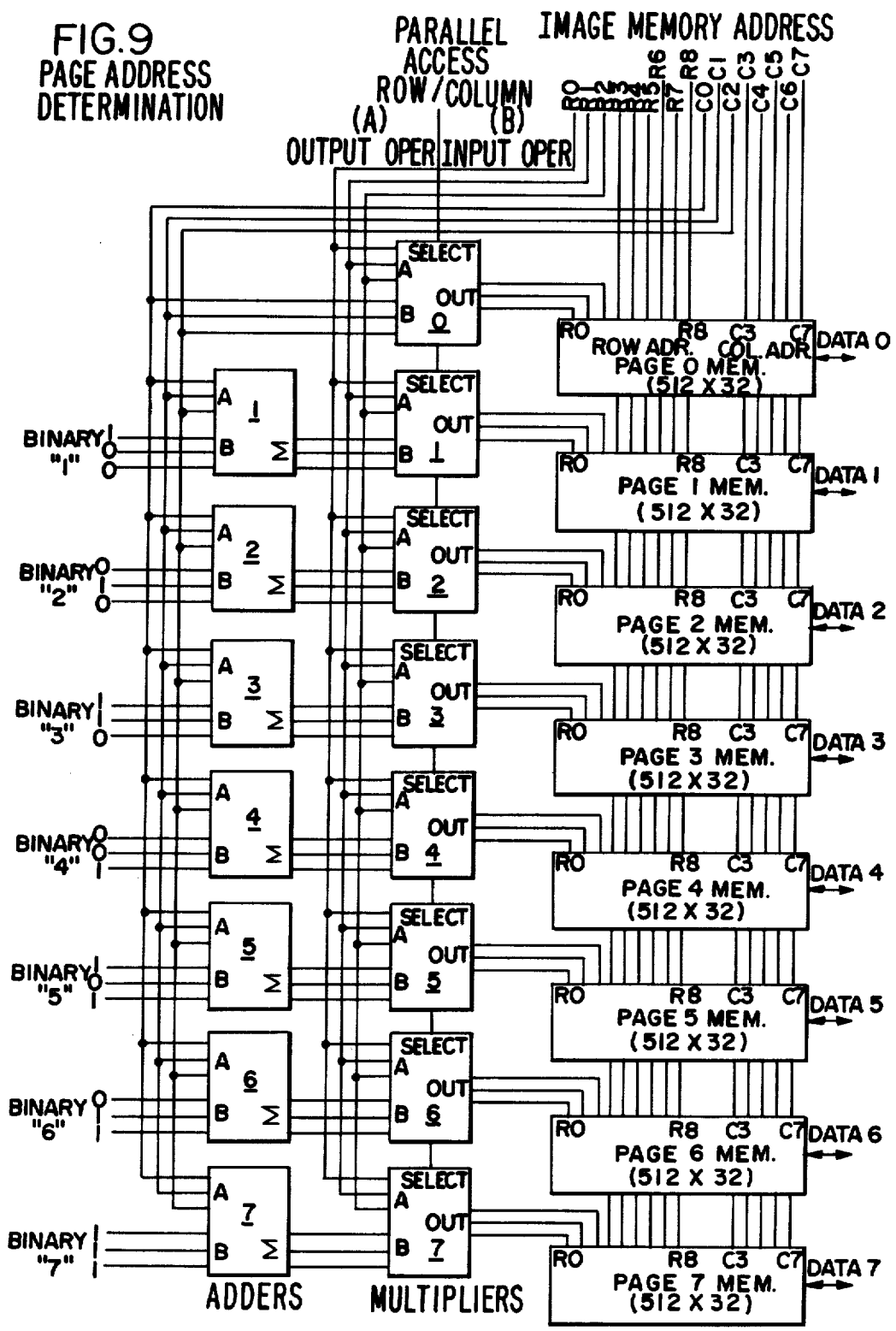

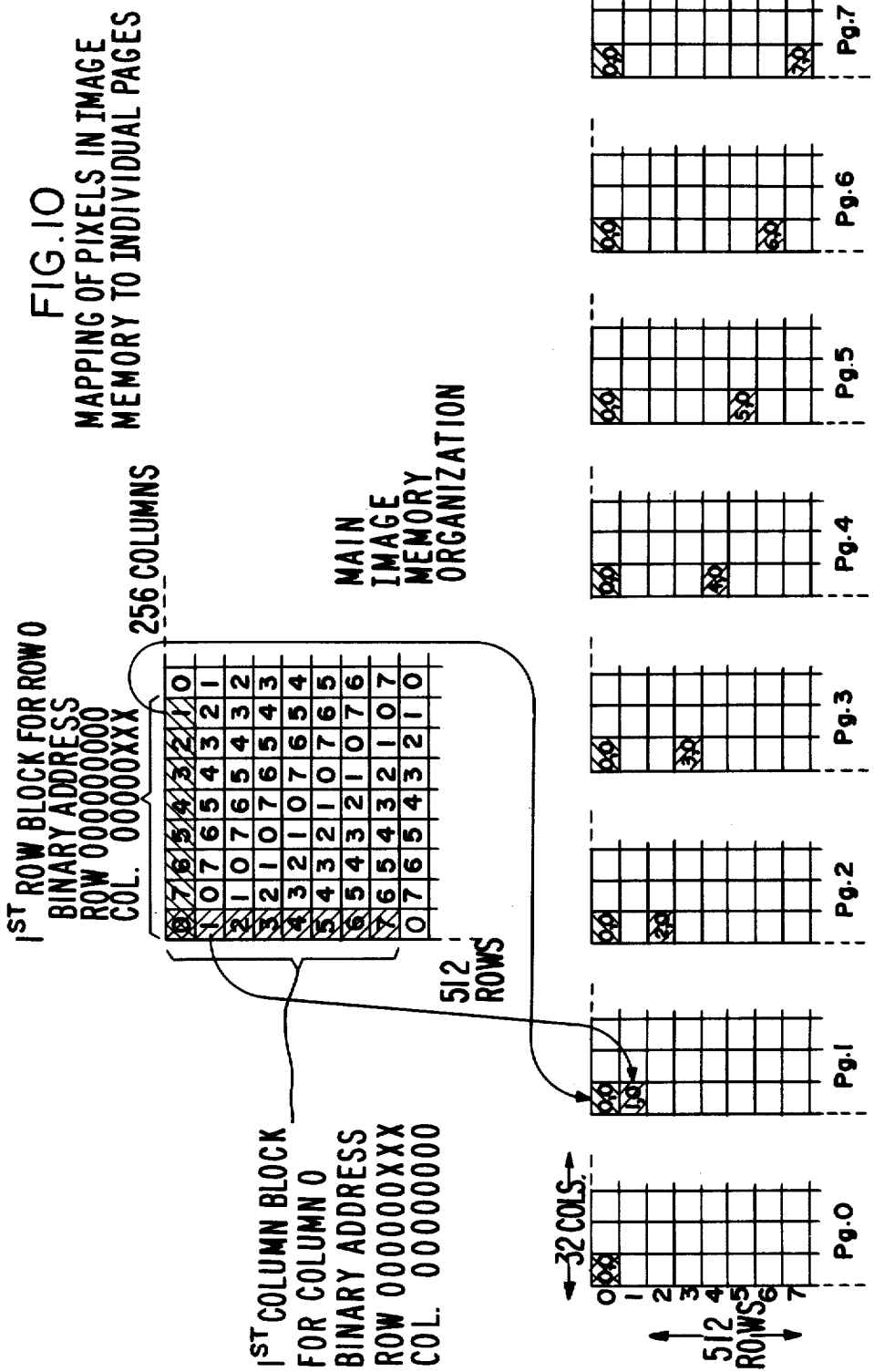
FIG. 10 MAPPING OF PIXELS IN IMAGE MEMORY TO INDIVIDUAL PAGES

PAGE ZERO MEMORY ORGANIZATION
(SUPERIMPOSED OVER IMAGE MEMORY ORGANIZATION)

ULTRASOUND SCAN CONVERSION AND MEMORY SYSTEM

DESCRIPTION

1. Field of Invention

The present invention relates to scan conversion systems enabling a scanning transducer suppling echo image information at high rates to input a CRT display operating with a typical standard television rectilinear format; and more particularly to an improved digital scan conversion system and image storage memory therefor.

2. Background of the Invention

In many ultrasound imaging systems, the transducer subsystems do not typically provide echo information in a format suitable for display by standard video subsystems. Thus the echo information signals must undergo scan conversion prior to display. For example, the transducer may be electronically or mechanically scanned through a fan-shaped sector with several hundred ray lines emanating from the transducer source and with echo data returning along the paths of the ray lines, each containing on the order of 400 pixels of image information, at real-time imaging rates.

Some type of memory expedient is therefore employed whereby incoming echo signals may be temporarily stored (at least for one frame) in a two-dimensional format representing pixels of image information. Once stored, the image information can be retrieved in an order and format compatible with the requirements of the display means, generally a standard television CRT display. Such memories can range from image storage tubes to dynamic memory chips, the latter being a very desirable alternative for today's digitally-oriented ultrasound scanner circuitry.

In utilizing such memory chips, it is highly desirable to keep the memory access rate for data transfers needed by the transducer and display subsystems as low as possible, since the cost of memory chips is roughly inversely proportional to the access rate accommodated by the chips. Keeping down the access rate requirements of transducer and display systems is not easily accomplished. As an example, for a typical stored rectangular pixel grid of image information of 512 rows by 512 columns, scanned in real time at standard video rates, the pixel access rate for video output alone amounts to 512 pixels in 63.5 microseconds, or a 8.06 megahertz access rate. This of course does not consider the further access rate requirement if echo data is to be inputted simultaneously. If data is simultaneously written into the memory, say at a typical lower-end rate of 2 megahertz, the overall memory access rate requirement already exceeds 10 megahertz. Only high-speed expensive memory components can accommodate such memory access rate requirements.

One recent approach attempting to ease access rate requirements has been to organize the image memory into separate pages. Such separate pages may then allow at least some elements thereof to be accessed simultaneously, at least during video output operations. The organization of a typical one of such prior art systems may be seen schematically in FIG. 1, which shows a memory organization for a standard image pixel grid of 512 rows and 512 columns, organized into eight pages. Each element of the image memory is shown with a routing or mapping number identifying the one of the eight pages upon which the pixel of image information corresponding to the memory element may be stored or found. Since the pixels are stored over eight pages, the routing numbers run 0 through 7. Across each row, the routing or mapping numbers of the elements then occur in a repetitive 0 through 7 pattern.

For video output operations in which the memory is read along successive rows as is typical for compatibility with standard formats, all eight pages can be accessed simultaneously. Thus, eight-element blocks can be furnished to a buffer, from which individual pixel elements may be retrieved serially for display. In this manner, for output operations, memory access rate requirements are reduced to 1 MHz, or to one-eighth the 8.06 megahertz rate otherwise necessary. However, for the input of echo data information, no improvement over the previous access rate requirement of about 2 megahertz is obtained. This is because parallel access during input operations is not generally possible, since the direction of received echo data information is not generally aligned with a horizontal row of memory along which distribution to different pages would be possible. This is a typical problem of prior art page memory organizations, in which at least for input operations, pixels must be accessed on an individual basis. Thus, the overall access memory rate is reduced to 3 megahertz due primarily to savings on the output operation side. This is a definite improvement, which allows the designer to work with memory components of less costly design and more modest, manageable response times and access rates.

However, the kinds of memory organization schemes typified by FIG. 1 do not provide enough improvement to handle comfortably the requirements of the more modern higher-speed transducer scanning means, which can easily provide so much echo signal information that memory access rates for data input may approach 5 megahertz, rather than merely 2 megahertz as assumed above. For example, such high-speed scanners can acquire echo information from along one of the ray lines of its sector scan pattern at rates of up to 12 kilohertz and higher, for shallow depths. Each of such lines of information may contain on the average 400 pixels. Thus the access rate requirement for data input can be 4.8 megahertz.

Additional factors are typically present which raise access rate requirements still higher. If, in order to enable processing of incoming data with data already in memory, a read operation is performed for every write operation of incoming data, the foregoing 4.8 megahertz access rate must be doubled to 9.6 megahertz. This of course does not include the additional increment of memory access rate needed to accommodate video output operations. Even with parallel accessing along rows for output operations as above discussed, accommodating of output operations means that overall memory access requirements will exceed 10 megahertz by a good margin. Accommodating such requirements, even with prior-art page memory organizations, requires memory components of high speed and prohibitive cost.

Further undermining the usefulness and practicality of organizing the memory into pages is the need for appropriate logic circuitry to determine the exact address within the page memory to which to assign a given pixel, or its corresponding data word. Obviously, a memory organization scheme such as FIG. 1 only tells on which page to store a given pixel element; it does not by itself give the actual address within that page for the actual storage or retrieval of the data word corresponding to the pixel. Such logic for calculation of page memory addresses can be complex and costly, especially when individual pixels must be accessed on an individual basis, as is the case at least during input operations, as seen above.

SUMMARY OF THE INVENTION

Accordingly, one object of the present invention is to provide a scan conversion memory system accommodating very high memory access rates or bandwidth requirements while avoiding complex and costly memory components.

Another particular object of the present invention is to provide a digital scan conversion system accommodating the output of a modern high speed sector scanner to the output of a conventional video display.

Yet another object of the invention is to provide a novel memory organization enabling parallel memory accesses for both input and output operations to ease access rate requirements while providing greatly enhanced levels of performance.

A further object of the invention is to provide a novel memory organization comprised of pages with individual addresses determinable by simple arithmetic operations, to minimize complexity, logic requirements, and access rate requirements.

A still further object of the invention is to provide a novel memory organization which may be comprised of inexpensive dynamic memory chips, but with the performance and access rate capability of more complex and expensive memories.

In one broad aspect of the invention, these objects are achieved by the provision of a memory arrangement for storing a two-dimensional array of M columns and N rows of data words which enables parallel access for both such columns and rows. The memory arrangement particularly includes the improvement of a plurality of page memories, each page storing m columns and n rows of data words, wherein $m = (M/X)$ and $n = N$ or $m = M$ and $n = (N/X)$ where X is an integer greater than 1. Both each row N and column M of the memory arrangement are organized in repetitive row and column blocks having X elements, ones of such row and column blocks interlocking to define the memory arrangement. Within any given one of the blocks, each element of a block is associated with a respective data word, and is identified with a respective different page memory, and its page number. Each data word is stored within the one of the page memories corresponding to the one page number to to which the memory element storing said data word is associated, whereby for both memory and row blocks, each data word is stored upon a respective different page, to enable said parallel access by blocks along either rows and columns of said memory organization.

In another broad aspect of the invention, these objects are achieved by the provision of apparatus for storing and retrieving data words, each corresponding to one of the pixels of a two-dimensional row and column array of image information, in parallel row and column blocks, each including a plurality x of data words. Such apparatus comprises a first plurality x of page memories, each storing a like fraction of the total data words, and defining a page row and column array of data word storage locations. The apparatus also includes means for repetitively accepting the incoming data words comprising successive ones of the column blocks, and for simultaneously storing, for each of the column blocks in turn, each data word of the column blocks within a different page. The apparatus further includes means for repetitively retrieving from the page memories data words comprising successive ones of said row blocks, the means retrieving words of a row block simultaneously, and each word of a block from a respective different page. In this manner a two-dimensional array of image pixels which is inputted in columns is stored simultaneously in parallel, in the form of blocks of data words, and on a different page memory for each word of the block. Readout is enabled in rows and also in simultaneous parallel row blocks thereof.

In still another broad aspect of the invention, the foregoing objects are achieved by a method for storing and retrieving data words, each corresponding to the pixels of a two-dimensional row and column array of image information, and acquired in successive rays each corresponding to one of the image columns. Such method comprises the step of providing a first plurality x of page memories for storing a like fraction of the total data words in a page row and column array of data word storage locations. The method further includes the step of repetitively accepting the incoming data words in successive blocks comprised of a plurality x of data words of one of the image columns and for each such block, storing each data word thereof on a different page simultaneously. This step includes the step of determining the page number of the first pixel of an incoming ray by subtracting the number of the ray or column from x, modulo x, and then determining the page numbers of subsequent incoming pixels of the ray by repetitively incrementing within the range 0, 1, 2 . . . $(x-1)$ from such first ray pixel page number, and accepting incoming pixel data words upon the page memories corresponding to such page number. The method also includes repetitively reading out successive rows of the page memories in simultaneous blocks of a plurality x of data words, to constitute rows of the image information, including the step of generating the page numbers indicative of the page numbers of the data words of the row blocks by repetitively incrementing over the range 0, $(x-1)$, $(x-2)$, . . . 1, with the first page number of said range being given by the row number. In this manner a two-dimensional array of image pixels which is inputted or acquired in columns is stored in simultaneous blocks on a different page memory for each word of the block, enabling input into the memory pages in a fraction of the time otherwise necessary, easing memory access rate requirements. The method enables readout in rows and in simultaneous parallel row blocks, thus implementing a scan conversion into a horizontal line output compatible with standard video display subsystems, and also enabling such output to proceed at rates greatly in excess of that otherwise possible.

BRIEF DESCRIPTION OF THE DRAWINGS

The invention will be more fully understood from the detailed description which follows, taken in conjunction with the drawings in which:

FIG. 2 shows in schematic form an ultrasound imaging system, particularly the scan conversion features and image storage memory features thereof;

FIGS. 5, 6 and 7 are alternative memory organizations similar to that of FIG. 4, but having a different order of mapping of image pixels to page memories;

FIG. 8 is a circuit showing in more detail a portion of the FIG. 2 system, for initial distribution of incoming image data pixels to storage in different page memories and in blocks of pixels for parallel access, in conformity with the image organization of FIG. 4;

FIG. 9 is a circuit showing in more detail the provision of certain inputs for the system of FIG. 2, for determining the exact location of each pixel in the page memories for both input and output operations;

FIG. 10 is a diagram showing the mapping of pixels of the main image memory organization to their corresponding locations in the different page memories;

FIG. 12 is a circuit showing in more detail the portion of the FIG. 2 system, for distribution of pixels during readout for parallel access, and in proper order for display, in conformity with the image organization of FIG. 4.

DETAILED DESCRIPTION

Figure 1:
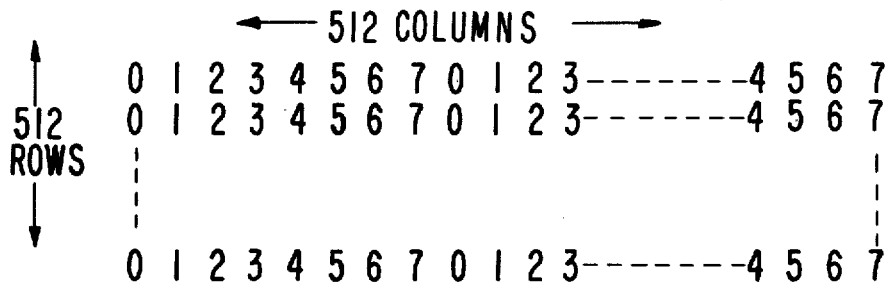
FIG. 1 shows in diagramatic form a typical prior art memory organization representing rows and columns of image pixels, in particular a 512 row by 512 column arrangement of such pixels, with the number at each pixel location showing which of eight memory pages is to be associated with that pixel.
Figure 3:
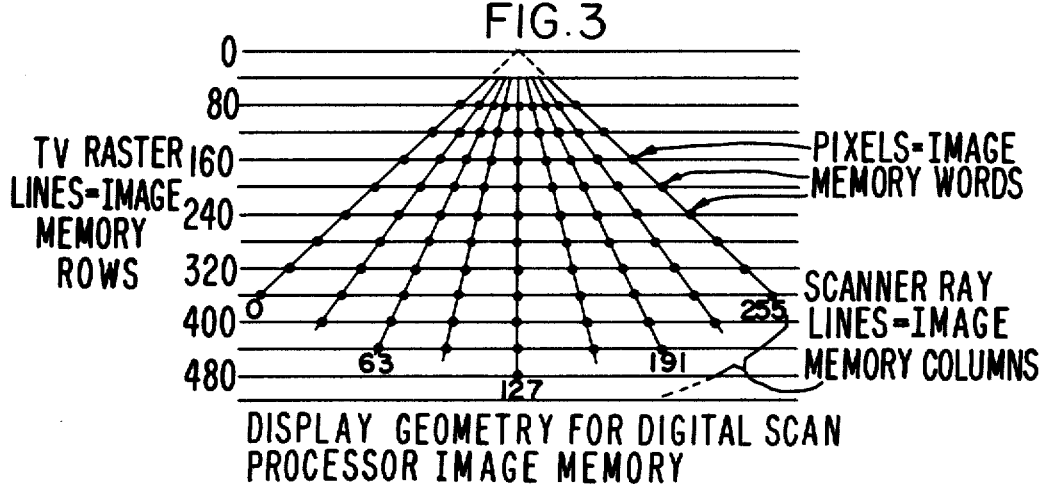
FIG. 3 depicts the fan-shaped sector scan produced by the transducer means of the FIG. 2 system, including the radial rays, raster lines, and image pixels comprising such scan.

FIG. 2 in simplified schematic form shows an ultrasound imaging system with particular emphasis on the scan converter system and image storage memory, in accordance with a principal embodiment of the invention. The transducer means 10 furnishes to the remainder of the imaging system an analog amplitude signal representative of the echo image data returning to the transducer, for example, from an internal organ of a patient under examination. Means 10 includes a transducer which may for example be a single element which is mechanically scanned, or preferrably, an electronically scanned phased array sweeping out a fan shaped sector comprised of several hundred resolvable ray lines, as shown schematically in FIG. 3. Transducer means 10 supplies to analog-to-digital converter 12 echo amplitude signals serially, representative of each of this multiplicity of ray lines, 256 in number in the case of the present system. Converter 12 supplies input multiplexing means 14, and the echo amplitude signals are thereupon rendered into digital words, each representative of a pixel of image information in accordance with the fan shaped format of FIG. 3. The 256 ray lines are correlated with 256 columns of image memory, while the rays are considered to be superimposed upon a standard set of horizontal video raster lines (except that only the first 512 lines of the full 525 line standard complement of raster lines is utilized). The pixels of image information are considered to be defined by the intersection of each ray line with a raster line (illustrated by the dots in FIG. 3). Thus the pixels are not evenly distributed, but fall within the sector scan arc (here of 84°), and tend to be more concentrated near the apex of the sector. This actual fan shaped pattern of pixels is, however, "warped" during scan conversion storage, since the columns of storage memory are identified with the angulated rays. This warped format does not in itself ease memory access requirements, except by virtue of the fact that input accessing is confined to accessing along individual columns only of the image memory organization. However, it is a first step in making possible a new memory organization allowing parallel access for both input and output operations, as will be explained below.

Input multiplexer 14 directs each of the incoming data words from converter 12 in turn to one of eight outputs from zero through seven positioned in a circular pattern, in clockwise order. In the case of the first ray of FIG. 3, the first data word corresponding thereto is directed to first output zero. Each output directs the corresponding data word to a corresponding element of an eight-element input buffer 15. Each element zero through seven of the buffer 15 is connected directly to a corresponding respective one of the eight page memories zero through seven, through a respective one of page memory data inputs 0a–7a. Upon the buffer 15 becoming fully loaded, its entire eight element content of data words, each corresponding to a pixel of image information to be stored, is simultaneously dumped as a complete block into corresponding ones of page memories zero through seven. Thus, the first word of the first ray is deposited in page memory zero, and subsequent words of the first eight-element block of words are deposited in the remaining pages in serial order. This is done repetitively for each arriving block of eight data words, until the entire first ray is stored in the page memory.

For subsequent rays, the mechanism is similar, except that the first element of subsequent rays is not necessarily deposited into the page memory zero. Instead, input multiplexer 14 is rest upon the arrival of each new ray to be inputted, in accordance with the image memory organization scheme illustrated in FIG. 4, by means to be described below. As previously, each element of image memory organization corresponds to a pixel of a pixel grid or matrix of image information of 256 columns and 512 rows as described in FIG. 3. Each column corresponds with one of the radial lines of information from transducer means 10. The rows correspond with the raster lines of a standard video display, and the pixels are defined by the intersections of the raster lines and the rays. The number at each element position of the image matrix or memory organization is the routing or mapping number identifying the one of the eight page memories zero through seven to which pixel corresponding to the element position is assigned. Since the pixels of the image matrix are to be stored over eight pages of memory, the mapping numbers run from zero through seven, as shown in FIG. 2. Storage over a number of pages other than eight is also possible, with eight being chosen in the present case for convenience and easy divisibility of the total numbers of both rows and columns.

Figure 4:
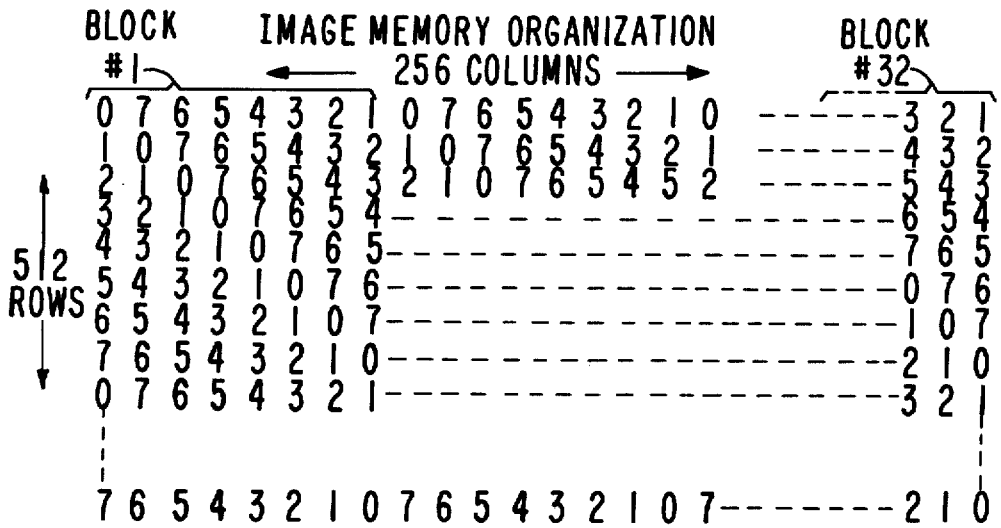
FIG. 4 shows a preferred image memory organization scheme of the invention, to accommodate the image provided by the sector scan of FIG. 3, and which maps each of the corresponding pixels of the image into one of eight memory pages.

As may be seen from FIG. 4, the page memory mapping numbers are each column or ray cycle consecutively within the zero to seven range, and then repeat, it an eight element block, until the end of that column. However, the mapping numbers begin with a different number at the start of each new column or ray. Specifically, the first column (column 0) begins with zero, and is comprised of a series of blocks (64) of elements, each block cycling from zero through seven. The second column (column 1) begins with a mapping number of seven and is comprised of a series of blocks (64) of eight elements, each block cycling through 7, 0, 1, 2, 3, 4, 5 and 6. The third column (column 2) begins with 6, and is comprised of a series of blocks (64) of elements, each block cycling through 6, 7, 0, 1, 2, 3, 4 and 5. Generally speaking, then, in the memory organization scheme of FIG. 4, the column mapping numbers cycle incrementally within a range 0, 1, 2 ... to (x−1), with x being the number of pages comprising the memory organization.

The rows of the memory organization are also comprised of eight element blocks. However, the order of the page memory routing numbers is reversed, with the numbers cycling incrementally over the range seven through zero. However, each row begins with a different number in that range. For example, the first row (row 0) begins with mapping number zero, and is comprised of a series of blocks (32) of eight elements, each block cycling through 0, 7, 6, 5, 4, 3, 2 and 1. The second row (row 1) begins with mapping number 2, and is comprised of a series of blocks (32) of 8 elements, each block cycling through 1, 0, 7, 6, 5, 4, 3 and 2. Generally speaking, then, in the memory scheme of FIG. 4, the row mapping numbers cycle incrementally within the range 0, (x−1), (x−2) ... to 1, with x being the number of pages comprising the memory arrangement.

It may be seen from FIG. 4 plot of the memory page mapping numbers for the organization that a key mapping characteristic is that the data words or corresponding pixels associated with individual ones of the page memories, fall along diagonal lines of the memory organization. Another key characteristic also is that the number of elements of the block is the same for both rows and columns, and within any such block, each element or corresponding pixel is assigned a respective different page. This has the immediate consequence of enabling parallel memory accesses, not only for output operations, but also for input operations; or parallel access not only along rows, but also along columns. Such parallel access in the case of the present embodiment can be done in blocks of eight, since each pixel of any block will belong to a separate page memory, which can be accessed in parallel with the remaining pages. Thus, for example, all 256 pixels corresponding to an entire row of the memory organization, or a complete raster line of sector scan, are accessible with 32 parallel page accesses, each involving eight pixels simultaneously. Similarly, all 512 pixels corresponding to an entire column of memory organization, or an entire ray line of sector scan, are accessible with only 64 parallel page accesses, each involving eight pixels at a time. Of course, the numbers of accesses required, the size of the blocks, and the number of pages necessary can all be varied to suit particular applications.

Figures 5, 6, 7:
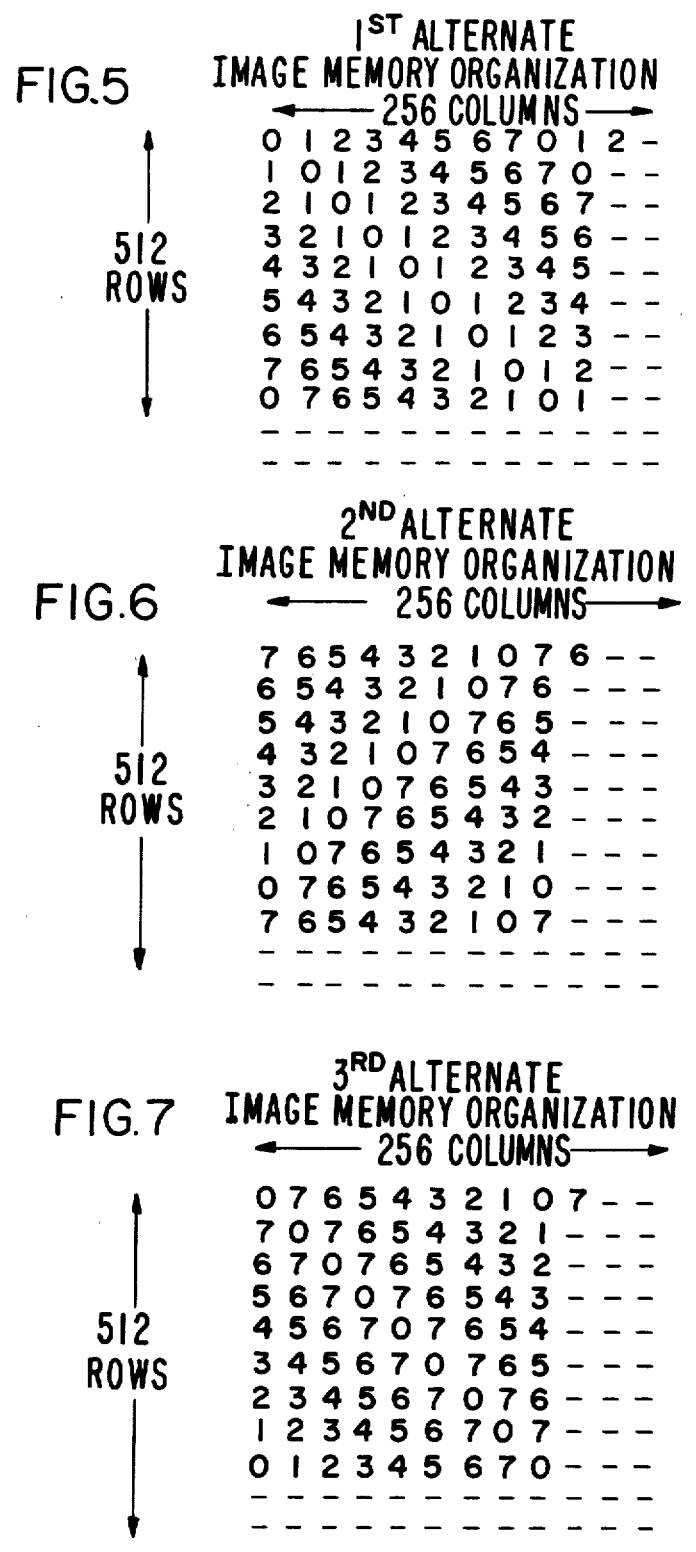

Further variations of memory organization of the type of FIG. 4 are also possible, as shown in FIGS. 5, 6 and 7. In FIG. 5, for example, the elements of both the columns and rows are numbered consecutively in the forward sense, rather than just the columns as in FIG. 4. Also, the first element of both the first column and the first row is 0, as in FIG. 4. In FIG. 6, both columns and rows are numbered consecutively in the reverse sense, with the first element of both the first row and first column being 7. FIG. 7 is similar to FIG. 6, except that the first element is again 0. Note that all are variations involving a basic block of eight elements. Of course, arrangements with larger or smaller numbers of elements within a block are possible, with the most workable numbers of elements ranging from four through twelve. In any event, however, the above mentioned key characteristics of memory organization must be in evidence, if parallel access for both rows and columns is to be possible—common routing numbers must lie on diagonals; and/or both columns and row blocks must contain the same number elements and each element within a given block must be assigned to a different memory page. It will be noted also that ordinarily this means that ones of the rows and column blocks interlock, to have at least one mapping number in common.

Returning to FIG. 2, it will now be appreciated that the system depicted implements and generates the memory organization or image memory matrix of FIG. 2, and shows how the incoming pixels of each successive ray of the sector scan are distributed into the page memories in accordance with the organization of FIG. 2. During input operations, input multiplexer 14 by virtue of its clockwise cycling through outputs zero through seven, automatically generates the page addresses for an entire incoming ray or column of memory organization. It accomplishes this by simply incrementing by one over its zero to seven range repetitively, once for each of the 512 pixels of an image column or ray, once it is set at the correct beginning number for the first pixel of the ray in question. The determination of this first page number (to accord with that given by the memory organization of FIG. 2), and the "clockwise cycling" effect, is actually accomplished by the simple logic circuitry of FIG. 8, (which is only one possible implementation of the principle). Transducer means 10 supplies to the FIG. 8 circuit via conventional means the number information, zero to 256, for each incoming ray. As mentioned above, each incoming ray is associated with one of the image memory organization columns, and thus this ray number is the image column number. This logic then simply tracks the number of the ray being inputted, or column number of the corresponding image or memory organization column, and subtracts that number from 8, modulo 8 (i.e., where the range of increments allowed is only from zero through seven). Stated more precisely, the starting position of input multiplexer 14 for the first sample or element of the incoming ray is given by subtracting the three least significant bits (LSBs) of the column/ray number from 8, modulo 8 (it is assumed the column address is specified by an 8 binary bit data word). Thus, for example, image column or ray 5 has a first page routing number associated with its first element of (8−5), or 3. Image column 1 has a first page routing number of (8−1), or 7.

FIG. 8 shows the analog-to-digital converter 12 and the input buffer 15 of FIG. 2 in more detail, as well as the input multiplexer 14, including the logic circuitry for the determination of the "first page number" of an incoming ray. Each element 0-7 of input buffer 15 is now seen to also have a strobe input connected to a respective one of the outputs 0–7 of a selector 18. However, it will be noted that though page 0 is thereby connected to output 0 of selector 18, the remaining outputs of selector 18 are connected to the pages in inverse order. Thus, selector output 1 is connected to page 7, output 2 to page 6, output 3 to page 5, and so on in ascending order of outputs to descending order of pages, ending with output 7 to page 1. The input of selector 18 is a three bit signal carrying a binary code indicating one of the numbers 0–7. The selector's function is simply to decode this three bit signal. Selector 18 receives such signal from the output of a three bit down counter 19 which in turn accepts from transducer means 10 the three Least Significant Bits (LSBs) of the image column number or ray number accompanying each new ray input. Both analog-to-digital converter 12 and down counter 19 are controlled by an input data clock in the conventional manner, so that the converter is properly incremented to digitize the incoming analog input signal, and the counter to increment down for each incoming pixel in turn. However, down-counter 19 has a further "load" input to which is directed from transducer means 10 a signal denoting the occurrence of a new ray or column. The three LSBs of image column number on the main "ABC" input of down counter 19 is thereupon directly transmitted to selector 18 which decodes same, and activates the appropriate buffer. With commencement of clocking for that ray, the down counting starts incrementing down from the page number first thusly inputted, repetitively over the range of outputs 0–7.

For example, the circuit determines the first pixel of the first image or ray (column 0), that is, the "first page routing number" of column 0, as follows: The first pixel arrives with the occurrence of a column start signal to the selector. Thereupon, in response to the column start signal, down counter 19 resets to 0, the three LSBs of the image column number of 0 at the main input of down counter 19 are directly inputted to selector 18 from down counter 19; decoded as 0; and the 0 element of buffer 15 activated by the 0 selector output, insuring storage of the first pixel of ray 0 in page memory zero, as required by the memory organization. For the next pixel, clocking begins, and down counter 19 increments to (1, 1, 1,), decoded by selector 18 as 7. This output 7, however, is connected to and activates buffer element 1, insuring the storage of the next pixel of ray zero in page memory 1, which is the proper storage called for by the image memory organization of FIGS. 4 and 9. In this way, the circuitry performs the required subtraction to find the first routing number of each column, and then cycles automatically to develop the remaining page routing numbers for each subsequent pixel of each column.

Figure 11:
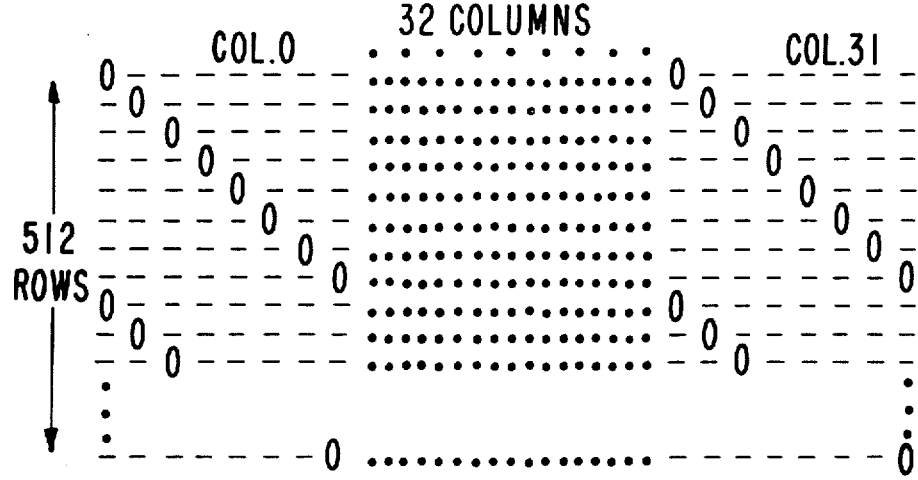
FIG. 11 is a diagram showing the correspondence of elements of the first page memory to the elements of the overall image memory organization.

We have seen above that upon a block of data words being inputted into buffer 15 by multiplexer 14, they are directly distributed to the data inputs 0a–7a of the pages corresponding to the eight respective elements of the buffer, and corresponding to the routing number for each data word. However, the data thereby delivered to the page memory needs to be written into the memories at particular addresses therein. Accordingly, the page address circuitry of FIG. 9 provides for the calculation of the exact page memory column and row addresses for each data input, and relays these addresses into appropriate address inputs 0a–7a of the memory, as shown in FIGS. 2 and 8. This circuitry operates to distribute the image memory pixels to the page memories in accordance with the scheme in FIG. 10. The page memory organization must be distinguished from the image memory organization, since each page memory will also be organized into rows and columns. Accordingly, the terms "page rows" and "page columns" will be used to distinguish from the rows and columns of the image memory organization. Since the order of the pages within an eight pixel block of the image memory changes with different memory rows or memory columns as we have seen, the accessing of data for each of the memory pages is normally complicated, depending on the particular image memory organizaton used. It can also be further complicated in consequence of the particular organization of the page memories which is employed. However, several fairly straightforward page memory organizations are possible, one of which is employed in the present embodiment, and illustrated in FIG. 10. Each page as illustrated in FIG. 10 may be seen to be organized into 32 columns and 512 rows. The corresponding elements of each page column then snake through the overall matrix of the image memory organization in zig zag manner, as seen in FIG. 11.

Note that each page contains 32 page columns, one for every eight of image columns, and thus the page column address for incoming data will change only once every eight rays (for image columns). For example, for the first eight rays, all incoming data will be entered in the first page columns. For the second eight rays, all incoming data will be entered in the second page columns; and likewise for each eight-ray multiple. Accordingly, the page column address for any given incoming data pixel is obtained by merely decoding the five most significant bits (MSBs) of the image memory column address/ray number. This will increment only once every eight image columns or rays, to establish the column position of the page address as above described.

For the page row address for each incoming data pixel in an image column block, the ray number/image memory column number (three LSBs) of the pixel is added to the page number (modulo 8) associated with the incoming pixel in the image memory organization matrix, and the result used for the three LSBs of the page memory row address in question. For example, the left-handed cross-hatched page portions in FIG. 10 illustrates where the pixels of the first column block of the incoming ray or of the image memory organization are stored in each of the eight page memories. Thus, for example, in calculating the page row address for pixels from the first block of incoming ray zero, the page row address of the first pixel is given by (zero + 0 modulo 8), or page row zero. For the second pixel of the first block, the row address is (zero + 1), or page row 1 (Of course, this is page row 1 of page 1, the page itself being known from the mapping number of the overall memory organization corresponding to the pixel in question and which is generated for each incoming pixel by the circuit of FIG. 8 above). For the third pixel, the row address is (zero + 2), or row 2 (of page 2). Subsequent pixels 3, 4, 5, 6 and 7 of the first block of the first ray are similarly written into rows 3, 4, 5, 6 and 7, respectively, of page memories 3, 4, 5, 6 and 7, as shown in FIG. 10. As mentioned previously, since all of these pixels are from the first ray, the page column address is column 0 for all. Since the data words corresponding to these pixels are at the same time delivered to the data inputs of the respective page memories to which they are assigned by buffer 15, the pixels are then written into the page memories utilizing these addresses calculated in the above manner by means of the address calculating circuitry of FIG. 9.

The mapping or calculation of page row and column addresses for incoming pixels not illustrated in FIG. 10 follows the same principles. For example, for the first block of ray 3, the page row addresses would be, for the first pixel of the block, (3+5 modulo 8), or zero. For the second pixel of the block, it is 3+6 modulo 8), or 1. For the third pixel, it is 3+7 modulo 8), or page row 2 (of page 7). For the fourth pixel, it is (3+0), or page row 3 (of page 0). For blocks of any ray or column subsequent to the first, the calculation tracks the numbers of blocks as well, and adds a multiple of eight for every subsequent block, to yield the actual page row address. For example, for the first pixel of the second block of ray zero, (image memory row 8), the page row address is (zero+zero) plus 8, or page row 8. The increment for blocks subsequent the first is actually obtained by decoding the 6 MSBs of the image row address, which increments once for every incoming column block of eight data words. Insofar as concerns the page column address, all of the above continue to be deposited in the first column (column zero) of the respective pages, since all the pixels being inputted continue to be only from the first eight rays of the image.

The circuitry of FIG. 9 is utilized for the actual calculation of the page addresses for both input and output operations, and supplies the address signals to address inputs $0a$–$7a$ of FIG. 2. These inputs are shown in more detail in FIG. 9, with the row address inputs being denominated $R_0$ ... $R_8$, to accommodate nine binary bits of row address signal, while the column address inputs are denominated $C_0$ ... $C_7$, to accommodate eight binary bits of column address signal. These inputs are associated with corresponding lines which are supplied with the image memory row and column addresses for each incoming pixel or data word block in accordance with the overall image matrix. For input operations, since the image column number is also the incoming ray number, the image column address signals for the inputs $C_0$ ... $C_7$ are generated by conventional means tracking the inputting of each ray and its pixels from transducer 10 and generating eight-bit column addresses in response thereto. Similarly, such conventional means also tracks the input of each column block of eight pixels/data words of an incoming ray/column, and generates 6 MSBs of image row address in response thereto. (For input operations, the remaining row LSBs are not needed since the events being tracked, which are the occurrences of a column block, happen only once every eight words, i.e., once every eight image rows. However, for output operations to be discussed below, the row LSBs will be needed, as will be seen.)

The lines conveying the image row address three LSBs for each data word input are routed to the A inputs of a plurality of multiplexor-selectors 0 through 7 (and the column LSBs are routed to the A inputs of a plurality of adders 1 through 7 for input operations), each such multiplexor-selector and adder being associated with a corresponding one of the page memories. Both the selectors and adders have an A and B input, and a single output. The output of each adder is connected to the B input of its corresponding selector, and the selector output supplies three LSBs of row address information to its associated page memory. The multiplexor-selector can be placed in either an A mode or B mode. In the B mode, the output from the corresponding adder is passed along to the associated page memory. The B mode is selected for input operations. (In the A mode, to be further discussed below, the signal at a selector input A is instead passed on to the page memory.) To the B inputs of each of the adders 0–7, a respective one of binary signals 0–7 is directed from a conventional generator supplying a steady signal. Such binary signal for each adder is indicative of the same number as that of the page memory with which the adder is associated. The A inputs of the adders receive three LSBs of image column address for each input pixel.

During input operations, the adders add the fixed signal denoting page number of the associated page memory to the image column number, modulo 8, to produce, simultaneously for each of the eight page memories, the page row address for each of the incoming data words of the column block then being dumped as a unit by the input buffer 15 into respective page memories described above in FIG. 8. The three bit page row address output of each adder goes directly to input B of the associated selector and passes directly therethrough to the page memory to become the three LSBs of the exact page row address for the incoming pixel to that page. (For page memory 0, the lines conveying the three LSBs of image column information are routed directly to the B input of corresponding selector 0.) Of course, all the above is done in parallel for all eight pixels of each incoming block, inputted at the eight data inputs $0a$–$7a$ of the page memories from the buffer elements of buffer 15.

Note also that the 6 MSBs of image row address signal are also inputted directly to the page memories. Since this increments once every eight data words of an incoming ray, or once every column block, the page row address obtained by the summing operation of address 1–7 and selector 0–7 is transposed or advanced in eight-row multiples for each new incoming column block, consistent with the mapping scheme of FIG. 10.

The page column addresses, which change only once for every eight rays of incoming data, are simply inputted directly to the page memories by the lines carrying the MSBs (Most Significant Bits) of the image memory columns. These cause the page column to increment at the completion of processing for every eight rays, as required.

Thus far, only input operations have been described in detail, and it has been shown how each of the 256 rays of image information, each ray including hundreds of pixels, are converted into respective data words and distributed over eight individual page memories, in blocks of eight pixels at a time, thereby drastically cutting access time requirements. But in addition, the image memory organization of FIG. 4 makes possible similar savings of access time requirements and other advantages for output operations, which are also done in parallel block fashion.

Assuming the memory pages have been fully inputted with a complete frame of image information in accordance with the organization of FIG. 4, the problem then becomes one of retrieving the pixels with parallel accessing, and in a manner suitable for feeding a conventional video display subsystem. This is done as illustrated schematically in FIG. 2 by retrieving the pixels in successive lines corresponding to rows of the image memory organization of FIG. 4, (and also corresponding to the horizontal raster lines of the sector scan of FIG. 3) and doing this in blocks of eight pixels. From page address locations determined as will be described below in connection with FIG. 9, each page memory simultaneously outputs a data word/pixel to a respective one of the elements 0–7 of output buffer 22 so that an entire block of pixels is simultaneously delivered to the buffer. The order in which each pixel/data word of the block is outputted serially to digital-to-analog converter 25, and thence to the video display subsystem, is determined by the output page selection circuitry of FIG. 12 in accordance with the overall image page organization of FIG. 4. Generally speaking, an output multiplexer 23 automatically generates the proper read out ordering of each block of pixels within buffer 22, for each successive block of an image row to be read out, as called for in the FIG. 4 image memory organization, by virtue of its counter-clockwise cycling through its outputs 7 through 0, once it is set at the correct beginning number for the first pixel of the row to be read out.

The determination of this first page number (to accord with that given by the image memory organization for the row in question) and the "counter-clockwise cycling" effect, is actually performed by the simple logic circuitry of FIG. 12 (which is only one of the possible arrangements to accomplish these requirements). The circuitry responds to conventional controller means triggering the output of each of the 512 image rows with a respective row address signal. The three LSBs of this number of the row to be outputted is also the page number for the first pixel of the image row being read out. FIG. 12 shows in detail the manner of read out from output buffer 22, and the details of output multiplexer 23. In addition to an input strobe and an output to a bus leading to digital-to-analog converter 25 (FIG. 2), each buffer element also includes an "output enable" input. Each such output enable input is connected to the respective corresponding one of the outputs 0 through 7 of output selector 28. Selector 28 merely decodes a three bit binary input, to activate a corresponding one of its outputs 0 through 7. The binary input to the selector 28 is supplied by the output of a three bit down counter 30. Counter 30 has a main three bit binary input indicative of the image memory organization row number, a clock pulse input, and a "load input" accepting a signal denoting the end of a row and the start of accessing for a new row.

Thus, to begin accessing for output, a new row access pulse is directed to the "load" counter input prior to commencement of clocking for the row to be read. The signal at the load input causes counter 30 to reset itself to the one of the eight numbers 0 through 7 corresponding to the three LSB row number of the image organization row address at the main input of the down counter. Such row address signals (9 binary bit data word) representative of the 512 image organization/row numbers of the rows desired to be outputted in serial order or otherwise may be generated by conventional controller means. Upon the image row number being thereby loaded into down counter 30, it is directly transmitted to selector 28, which then decodes same and enables the corresponding proper buffer element to output the first pixel of the row being read out. Clocking for subsequent pixels of the row then commences, causing the down counter to increment down once for each pixel read out, downwardly from the first page number just determined for the row. The down counter cycles repetitively over the range of outputs 0 through 7, to generate the page numbers for all subsequent pixels of the row being outputted, by decreasing the page number of the previous pixel by 1, (with (0−1), going to 7).

Of course, determining the pages and corresponding elements of output buffer 22 upon which are stored the pixels comprising the row to be read out as explained above, does not of itself tell where in each of the page memories the particular pixel is to be found. In other words, for each pixel to be read out, not only must the page be known, but also the page address, so that the proper pixel from each page is outputted to the corresponding elements 0–7 of output buffer 22, and thence to the display subsystems of the instrument. At this point, it is then useful to consider again FIG. 10, which shows not only the manner in which image pixels are read into the page memories, but also the scheme by which they are read out. The locations in right-handed cross-etching are the locations of the stored pixels of the first row block of the image memory, which is the first to be read out. As may be seen, all pixels of the first row block are found in the first page column, first row position. The next block of the first image row also is accessed at the first page row, but the column is now the second column in all pages. Subsequent blocks of the first image row are similarly accessed from the first page rows, but for each successive block, the page column increments by one. Thus, it may be said generally that page address for output operations is given as follows: the page row is the same as the image memory row, and the page column advances by one only every eight pixels, and is thus given by the 5 MSBs of the image column address.

The circuit which implements the foregoing page address determination upon output is that of FIG. 9 (which also was seen to determine page addresses for input operations). However, for output operations, the multiplexor selectors 0–7 are all switched to mode A, whereby only the signal at the A inputs are passed on to the page memories. As previously seen, the three lines of the A input of each selector are respectively tied to the $R_0, R_1$, and $R_2$ lines, which convey the 3 LSBs of the image memory row address for each data word, or pixel, input from the aforementioned conventional means for generating the image row address signals in order for the 512 raster lines/image rows to be outputted, (the conventional means also supplying the remaining 6 MSBs of image row address signals to lines $R_3$–$R_8$ directly to the page memories). Thus, the multiplexer-selectors in this mode merely convey directly and simultaneously to each of the pages the three LSBs of image memory row address, at page inputs $R_0$–$R_2$, while the remaining bits of the image row address arrive at the pages directly via lines $R_3$–$R_8$. This causes the same row to be accessed in the page as for the image matrix or memory, as required for output operations. As seen previously, the 5 MSBs of image column address are also directly inputted to each of the pages simultaneously via lines $C_3$–$C_7$. The three LSBs of image column address are not utilized, since the events to be tracked are the occurrence of each row block of output, which is given by the 5 MSBs of image column address. For example, the page column address is, for the first eight pixels, column 0; thereafter incrementing once every eight output pixels, or every row block of output, as required. In this manner, the FIG. 9 circuitry implements the determination of page addresses for output operations.

As was seen in connection with FIG. 12, for output operations all eight pixels of a block are again parallel-accessed by being retrieved simultaneously from separate pages. Since all the page memories are simultaneously supplied the page row address, which does not change for an entire row being outputted, and which is the same for all, and the column address, also the same for all, and which changes by one only every eight pixels for each block the circuit of FIG. 9 in A mode simultaneously determines the page addresses for the pixels thereof for all eight pages. Thus, all eight pixels of each block are dumped simultaneously into elements 0–7 of output buffer 22. From element 9 through 7 of output buffer 15, the FIG. 12 circuit operates as we have seen to output the buffers in the proper order, in accordance with the page schemes of each row in turn of the image memory organization. The now serial outputs from the output buffer go in turn to digital-to-analog converter 25, which sends a now analog output signal to the video display subsystem of the ultrasound imaging system.

Accordingly, the foregoing system enables memory parallel access with equal facility for output operations, as well as input operations. Since data words are both inputted into and outputted from the memory in blocks of eight, memory access requirements are cut to a fraction of that otherwise necessary in the absence of the present memory organization and system, thus enabling the use of cheaper, slower-speed memory components. Yet performance is enhanced, and the system has no problem handling the output of real-time phased-array transducer means, even with additional signal processing, for example, to process incoming data with data already in memory. Furthermore, calculation of one page memory addresses is greatly simplified, and done by relatively straightforward arithmetic operations.

I claim:

1. A memory arrangement for storing a two-dimensional array of M image memory columns and N image memory rows of data words and enabling parallel access for both said columns and said rows, wherein the improvement comprises:

X page memories comprising said memory arrangement, each page having a page number associated therewith and storing m page columns and n page rows of data words, wherein $m = M/X$ and $n = N$ where X is an integer greater than 1 first means for providing a plurality of repetitive first blocks each comprising X data words corresponding to X successive data words along an image memory column, second means coupled to said first means for selecting one of said page numbers and respective page row and column for each of said data words in each of said first blocks whereby each data word in a block is associated with a respective different page memory, and is associated with one of said page columns on its corresponding page according to its image memory column whereby the page column changes every X image columns, and wherein the page row of each data word is determined by adding the page number of the data word modulo X to the image column, said second means including means for causing each of said data words in said first blocks to be stored in the respective selected row and column of the respective selected page memory, and means for reading second blocks from said page memories, said second blocks each comprising X data words corresponding to X successive data words along an image memory row, by accessing a particular page column and row of each of said plurality of page memories.

2. A memory arrangement as set forth in claim 1 in which the improvement further comprises said first and second blocks interlocking to define at least one diagonal of identical page routing numbers within said two-dimensional array of said memory arrangement.

3. A memory arrangement as set forth in claim 1, in which $X = 8$, and in which said second blocks are column blocks, and whose page numbers range incrementally over the numbers 0, 1, 2, 3, 4, 5, 6, 7.

4. A memory arrangement as in claim 3, in which said second blocks are row blocks, and whose page numbers range incrementally over the numbers 0, 7, 6, 5, 4, 3, 2, 1.

5. A memory arrangement as set forth in claim 3, in which the page numbers for the first data word in each first block of each column ranges incrementally over the numbers 0, 7, 6, 5, 4, 3, 2, 1.

6. A memory arrangement as in claim 1, in which the page numbers of said second blocks range incrementally from 0, 1 ... (X − 1), while the page numbers of said first blocks range incrementally from 0, (X − 1), (X − 2), ... to 1.

7. A memory arrangement as in claim 6, in which $X = 8$.

8. A memory arrangement as in claim 6, in which the starting numbers for said second blocks increments by 1 for each succeeding column, over the range 0, (X − 1), (X − 2) ... to 1, while the starting numbers for said second blocks increment by 1 for each succeeding row over the range 0, 1 ... (X − 1).

9. A data word organized memory system for storing an image array of data words arranged in M image memory columns and N image memory rows and enabling parallel access for both said columns and said rows in a single memory cycle, the system comprising:

ultrasound transducer means for providing an analog signal representative of a plurality of echo imaging rays, convertor means for converting said analog signal into a plurality of data words, each image array column of data words representing one of said rays, a plurality of page memories having a page number associated therewith, incoming data routing means connected to said page memories and said convertor means for subtracting from X the column number in which the data word is arranged, modulo X, where X is an integer greater than 1, to determine the page number of the first data word of the incoming column, selection means coupled to said incoming data routing means for selecting the page number for subsequent data words, input buffer means comprising a plurality of first storage locations each of which is connected to a corresponding page memory, said input buffer means storing one incoming data word in each of said first storage locations corresponding to the page memory determined by said data routing means and said selection means, whereby when said first storage locations are loaded, the data words stored therein are deposited simultaneously into the page memories, means for determining an exact page row and column address for each incoming data word simultaneously with the storage of said data words connected to said input buffer means, and connected to each of said page memories, output buffer means comprising a plurality of second storage locations each of which is connected to a corresponding page memory, said output buffer means storing data words in each of said second storage locations received from the corresponding page memory, output data routing means connected to said page memories and said second storage locations for selecting the page memory from which one of said data words is selected to be loaded into a corresponding second storage location, said data routing means retrieving the data words from adjacent column locations in the image array simultaneously, whereby while some of said data words representative of echo imaging rays are stored others of said data words are being retrieved simultaneously, enabling parallel access of said system for input and output of the image array.

10. The system of claim 1 wherein said data words are organized in a plurality of repetitive first blocks which comprise said image array columns and in a plurality of repetitive second blocks which comprise said image array rows.

11. The system of claim 10 where said input buffer means stores one of said first blocks at a time, such that when said storage locations are loaded, the data words in said loaded first block are deposited simultaneously in said plurality of page memories.

12. Apparatus as in claim 10, which further includes second means for determining an exact page address for each outgoing data word of a block simultaneously with the retrieving of said block connected to said output data routing means.

13. Apparatus as in claim 12 in which said outgoing lines of data comprise row image information, and in which said second means for determining page address for outgoing data includes means for identifying the image row address and utilizing same as the page row address.

14. Apparatus as in claim 13 in which said second means for determining includes means for incrementing, from the first of the page columns, by one page column position for every succeeding block of outgoing row information, to determine the column page address for said outgoing data words.

15. Apparatus as in claim 9 in which said page memories each define a plurality of data word storage locations organized in page rows m and page columns n, said page rows and page columns being related to the rows M and columns N of the information by the relationships $$m = (M/X) \text{ and } n = N$$

where X is an integer greater than 1.

16. Apparatus as in claim 9 in which said selection means comprises:

counter means for repetitively incrementing, for each incoming data-word subsequent said first data word, over the range 0, 1, 2 ... (X−1) from said number of the first data word of the incoming column, to determine the page number for subsequent data words.

17. Apparatus as in claim 9 in which said incoming rays comprise column image information, and in which said means for determining said exact page address includes means for adding the image column number to which said incoming word pertains to the number of the page on which said data word is to be stored modulo X, to obtain the row page address for said incoming word.

18. Apparatus as in claim 9, in which said means for determining said exact page address includes means for incrementing, from the first of the page columns, by one page column position for every eight incoming columns of image information, to determine the column page address for said incoming word.

19. Apparatus as in claim 9 in which said output data routing means increments over the range 0, (X−1), (X−2) ... 1, beginning with the number of the column to which the outgoing data pertains, to determine the page from which to retrieve each data word of outgoing data.

20. A memory arrangement for storing a two-dimensional array of M image memory columns and N image memory rows of data words and enabling parallel access for both said columns and said rows, wherein the improvement comprises:

X page memories comprising said memory arrangement, each page having a page number associated therewith and storing m page columns and n page rows of data words, wherein $$m = M \text{ and } n = N/X$$

where X is an integer greater than 1 first means for providing a plurality of repetitive first blocks each comprising X data words corresponding to X successive data words along an image memory row, second means coupled to said first means for selecting one of said page numbers and respective page row and column for each of said data words in each of said first blocks whereby each data word in a block is associated with a respective different page memory and is associated with one of said page rows on its corresponding page according to its image memory row whereby the page row changes every X image rows, and wherein the page column of each data word is determined by adding the page number of the data word modulo X to the image row, said second means including means for causing each of said data words in said first blocks to be stored in the respective selected row and column of the respective selected page memory, and means for reading second blocks from said page memories each of said second blocks each comprising X data words corresponding to X successive data words along an image memory column, by assessing a particular page column and row of each of said plurality of page memories.

21. System for storing and retrieving a two-dimensional array of pixels of M rows and N columns in input blocks, each block comprising a plurality X of pixels, and enabling retrieval of said pixels in output blocks of a plurality X of pixels, comprising:

means for delivering lines of pixels to be stored and for associating each of said lines of pixels sequentially with one of said array columns;

a plurality X of page memories, each having m rows and n columns where $$m = (M/X) \text{ and } n = N$$

where X is an even integer greater than 1;
means for storing each of said input pixels on a corresponding one of said page memories, comprising:
first multiplexer means for directing each of an input block X of pixels from said means for delivering to a different one of said page memories in sequence, repetitively for said entire incoming line;
subtractor means connected to said first multiplexer means and said page memories for determining which one of said X page memories the first pixel of the first incoming one of said lines is directed, said subtractor means including means for subtracting from the number of the array column the number X of pixels in an input block, to arrive at a number representing said one page memory;
and means connected to said subtractor means and said page memories for determining the page address within the page to which each pixel is assigned, comprising:
means, coupled to said means for delivering lines of pixels, for providing a signal upon the arrival of the last input line in a unit of X input lines, and thereupon in response to saod sognal activating a subsequent column of said page memories to receive subsequent pixels,
and means for determining the page row address for each incoming pixel including means for adding to the page number for the pixel the column or ray number of the pixel modulo X, to arrive at a number representing said page row address:
means for retrieving connected to said page memories each of said input pixels from one of said page memories, comprising:
second multiplexer means for directing each of a block X of outgoing pixels from a different one of said page memories in sequence, repetitively for an entire outgoing line;
means for determining an exact page address for an entire outgoing line,
whereby while each incoming pixel within an input block is directed to a different page memory, and thereby parallel access by blocks is provided for input operations, each outgoing pixel within an output block is retrieved from a different page memory thereby providing parallel access by blocks for output operations.

22. Apparatus for storing and retrieving data words each corresponding to one of the pixels of a two-dimensional row and column array of image information, and acquired in successive ones of said columns, said apparatus storing and retrieving said data words in parallel blocks, each of a plurality X of data words of said image row or said image column wherein X is an integer greater than 1, and comprising:
ultrasound transducer means for providing an analog signal representative of a plurality of successively numbered echo imaging rays,
convertor means for converting said analog signal into a plurality of data words, each image array column of data words representing one of said rays,
a plurality X of page memories, each storing a like fraction of the total of said data words in a plurality of page rows and column arrays of data word storage locations;
means for repetitively accepting the incoming data words of successive ones of said column blocks from said convertor means, and storing each data word of one of said blocks in a different page simultaneously, comprising:
calculating means connected between said accepting means and said page memories for subtracting from X the number of the ray/column modulo X, to determine the page number of the first pixel of an incoming ray,
counter means connected to said calculating means for repetitively incrementing with the range 0, 1, 2 ... (X−1) from said first ray pixel page, to determine the page number indicating the page on which to store said first pixel, and
input buffer means having elements each identified with a respective one of said page memories, for accepting incoming data words in the order determined by said calculating and counter means, and for inputting an entire block of said data words into said page memories simultaneously; and
means for repetitively reading out successive rows of said page memories in simultaneous row blocks of data words, comprising:
output buffer means having elements each identified with a respective one of said page memories, for accepting a data word/pixel from each of the page rows simultaneously, and
control means connected between output buffer means and said page memories for repetitively incrementing over the range 0, (X−1), (X−2), ... 1, to generate the page number controlling the output order for said buffer elements;
whereby a two-dimensional array of image pixels which is inputted in columns is stored in simultaneous parallel column blocks of a plurality of data words on a different page memory for each word of the block, and which is then readout in rows and in simultaneous parallel row blocks.

23. A method of storing and retrieving digital data words in blocks of a plurality X of data words by parallel accessing a plurality X of page memories, where the data words are arranged in rows and columns comprising a memory array of information, and said memory array comprises first blocks comprising X data words of either a row or column and second blocks comprising X data words of the remaining one thereof, wherein X is an integer greater than 1, said method comprising the steps of:
repetitively accepting incoming data words comprising successive ones of said first blocks by temporarily retaining each word of said first block in a respective element of a buffer, and associating each element of said buffer with a respective one of said page memories;
storing, for each of said first blocks in turn, each data word thereof simultaneously, and on a different respective page memory by determining the page for storing of the first data word of a first block by subtracting from X the number of the first row or column to which said block pertains modulo X, and determining the page memory for storage of the data words of said block by selecting a page number from the set 0, 1, . . . (X−1) wherein each data word of a block is associated with a respective different page memory;
repetitively retrieving from said page memories for output a plurality X of output data words simultaneously, each said retrieved plurality comprising one of said second blocks, each of each words of said retrieved plurality being from a respective different page by selecting the page number from the set (0, X−1, X−2, ... 1);

whereby for both input and output of data words, accessing said memories in simultaneous blocks is effected.

24. A method as in claim 23 which includes the additional step of assigning separate page addresses to each of the incoming data words of a first line, simultaneously with the storing of each of said first blocks.

25. A method as in claim 24 in which said first lines are equivalent to said columns of said array, and said second lines are equivalent to said rows of said array, said first blocks being comprised of said column information, said second blocks being comprised on said row information, and in which the row page address assigned each incoming data word is determined by adding the array column number to which said incoming data work pertains, to the number of the page on which said incoming data word is to be stored.

26. A method as in claim 25 in which the column page addresses assigned each incoming data word is, for the first eight array columns, the first page column, thereafter incrementing one page column for every eight array columns.

27. A method as in claim 23 which includes the additional step of determining the exact page addresses simultaneously for each of the outputted data words of said second block, repetitively for each of said second lines.

28. A method as in claim 27 in which said first lines are equivalent to said columns of said array, said second lines are equivalent to said rows of said array, said first blocks being comprised of said column information, said second blocks being comprised of said row information, and in which the row page addresses for each outgoing data word are the same as the array row addresses.

29. A method as in claim 28 in which the column page address for each outgoing data word is, for the first of the outgoing second blocks, the first page column, thereafter incrementing one page column for each succeeding second block of each of said second lines.

30. A method as in claim 23 in which said first blocks are comprised of said column information, and said second blocks are comprised of said row information.

* * * * *